US012587697B2

(12) United States Patent
Shao

(10) Patent No.: US 12,587,697 B2
(45) Date of Patent: Mar. 24, 2026

(54) PROGRAM GENERATION AND BROADCASTING METHOD, DEVICE AND SYSTEM

(71) Applicant: BOE TECHNOLOGY GROUP CO., LTD., Beijing (CN)

(72) Inventor: Lei Shao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 117 days.

(21) Appl. No.: 18/270,920

(22) PCT Filed: Aug. 10, 2022

(86) PCT No.: PCT/CN2022/111344
§ 371 (c)(1),
(2) Date: Jul. 5, 2023

(87) PCT Pub. No.: WO2024/031412
PCT Pub. Date: Feb. 15, 2024

(65) Prior Publication Data
US 2024/0388753 A1     Nov. 21, 2024

(51) Int. Cl.
*H04N 21/262*        (2011.01)
*H04N 21/234*        (2011.01)
*H04N 21/254*        (2011.01)

(52) U.S. Cl.
CPC . *H04N 21/26233* (2013.01); *H04N 21/23418* (2013.01); *H04N 21/2541* (2013.01)

(58) Field of Classification Search
CPC ....... H04N 21/26233; H04N 21/23418; H04N 21/2541
See application file for complete search history.

(56) References Cited

U.S. PATENT DOCUMENTS 11,457,270 B1 * 9/2022 Venugopal ....... H04N 21/44016
2006/0287913 A1 * 12/2006 Baluja ................... G06Q 30/02
705/14.54
(Continued)

FOREIGN PATENT DOCUMENTS

CN        103747282 A      4/2014
CN        104219535 A      12/2014
(Continued)

*Primary Examiner* — Randy A Flynn
(74) *Attorney, Agent, or Firm* — WHDA, LLP

(57)        ABSTRACT
The present disclosure provides a program generation method, a program broadcasting method, a program generation device, a program broadcasting device, and a program generation system. The program generation method for a server includes: obtaining a media material uploaded by a user, and auditing the media material; selecting a target display terminal; receiving program parameter information inputted by the user; generating information about a target program in accordance with the program parameter information and a display parameter of the target display terminal, the information about the target program including program information and plan information, the program information being used to indicate information about the media material in the program, and the plan information being used to indicate a broadcasting mode of the program; and transmitting the information about the target program to the target display terminal.

11 Claims, 2 Drawing Sheets

(56)                    References Cited

U.S. PATENT DOCUMENTS

| | | | |
|---|---|---|---|
| 2013/0159869 A1* | 6/2013 | Faraji .................. | H04L 12/1881 |
| | | | 715/738 |
| 2017/0155943 A1 | 6/2017 | Liu | |
| 2019/0082239 A1* | 3/2019 | Webster ............. | H04N 21/2743 |
| 2021/0374800 A1* | 12/2021 | Shriram ............ | G06F 16/24575 |

FOREIGN PATENT DOCUMENTS

| | | | |
|---|---|---|---|
| CN | 104469484 A | 3/2015 | |
| CN | 104580834 A | 4/2015 | |
| CN | 106488274 A | 3/2017 | |

* cited by examiner

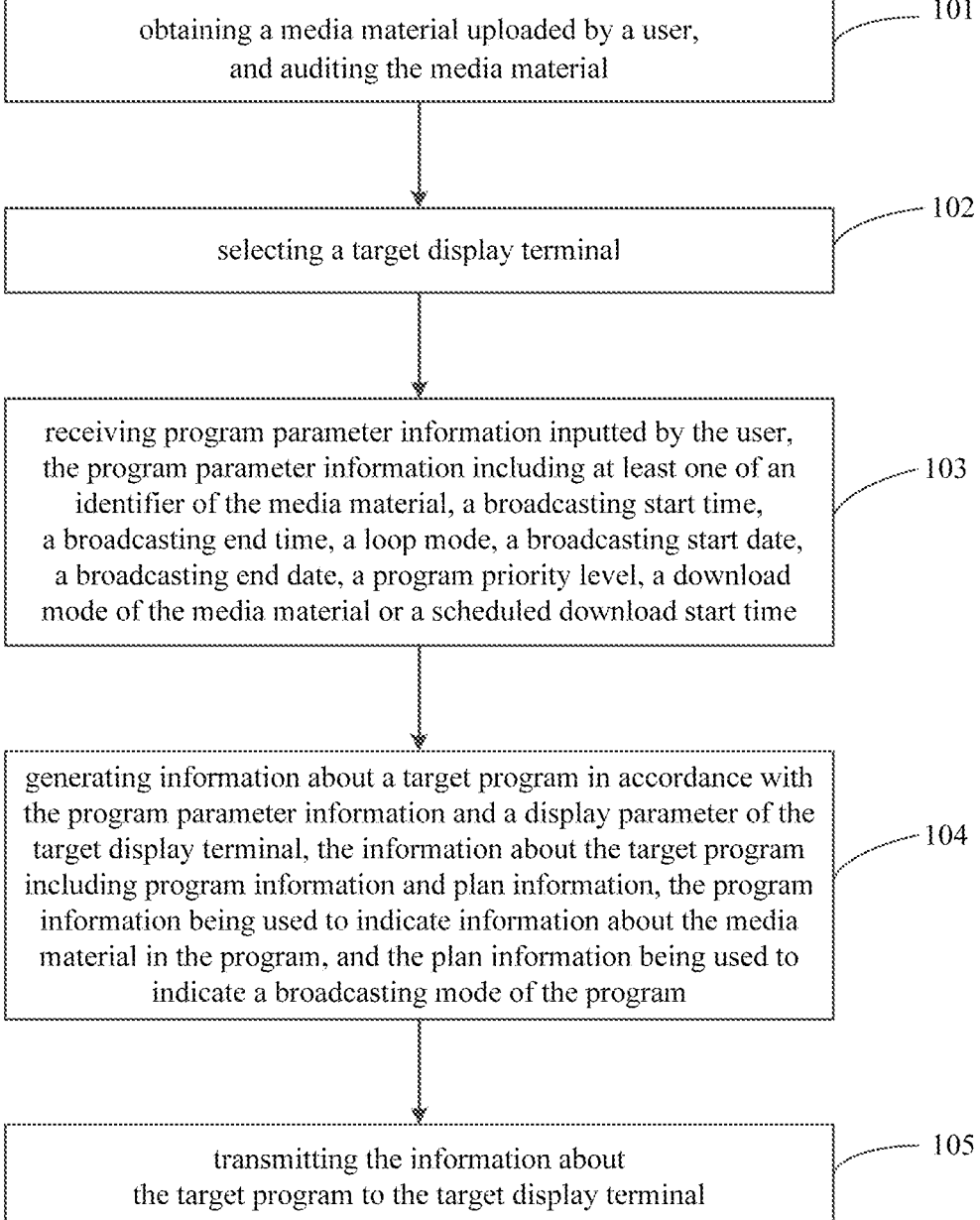

obtaining a media material uploaded by a user,
and auditing the media material — 101 selecting a target display terminal — 102 receiving program parameter information inputted by the user,
the program parameter information including at least one of an
identifier of the media material, a broadcasting start time,
a broadcasting end time, a loop mode, a broadcasting start date,
a broadcasting end date, a program priority level, a download
mode of the media material or a scheduled download start time — 103 generating information about a target program in accordance with
the program parameter information and a display parameter of the
target display terminal, the information about the target program
including program information and plan information, the program
information being used to indicate information about the media
material in the program, and the plan information being used to
indicate a broadcasting mode of the program — 104 transmitting the information about
the target program to the target display terminal — 105

Fig. 1

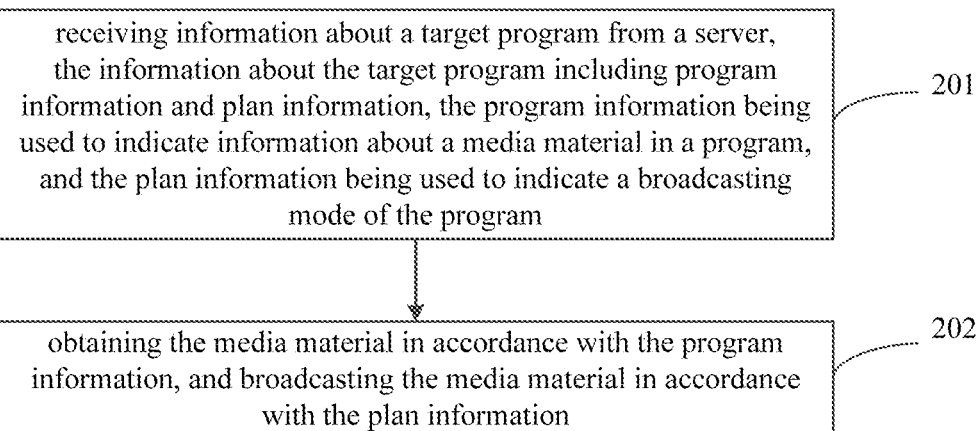

receiving information about a target program from a server, the information about the target program including program information and plan information, the program information being used to indicate information about a media material in a program, and the plan information being used to indicate a broadcasting mode of the program — 201 obtaining the media material in accordance with the program information, and broadcasting the media material in accordance with the plan information — 202

Fig. 2

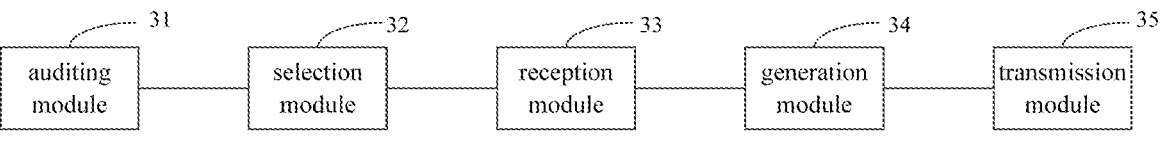

| auditing module | selection module | reception module | generation module | transmission module |

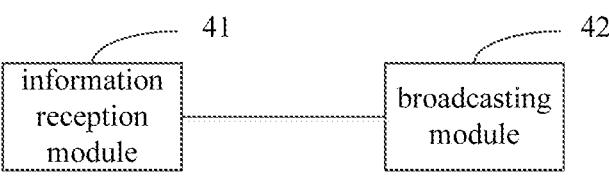

| information reception module | broadcasting module |

PROGRAM GENERATION AND BROADCASTING METHOD, DEVICE AND SYSTEM

CROSS-REFERENCE TO RELATED APPLICATION

This application is the U.S. national phase of PCT Application No. PCT/CN2022/111344 filed on Aug. 10, 2022, the entire contents of which are hereby incorporated by reference.

TECHNICAL FIELD

The present disclosure relates to the field of program editing technology, in particular to a program generation method, a program broadcasting method, a program generation device, a program broadcasting device and a program generation system.

BACKGROUND

All-media control platform is used to remotely manage all screen devices of Light-Emitting Diodes (LEDs) and Liquid Crystal Displays (LCDs) in such scenarios as airports, subways, and high-speed railway platforms, and cooperatively control all the screen devices with a remote central server through Internet of things, so as to remotely deliver a program plan to a terminal for display.

The arrangement of the program plan includes five steps, i.e., uploading a program material, auditing security of content of the program material, editing content of a program, editing a schedule of a program broadcasting plan and auditing the program broadcasting plan. In the related art, it is necessary to manually produce and typeset the content of the program in a program editor, resulting in such problems as a heavy workload, an increase in the cost of media program arrangement, and low program production efficiency.

SUMMARY

An object of the present disclosure is to provide a program generation method, a program broadcasting method, a program generation device, a program broadcasting device and a program generation system, so as to improve the program production efficiency.

The present disclosure provides the following technical solutions.

In one aspect, the present disclosure provides in some embodiments a program generation method for a server, including: obtaining a media material uploaded by a user, and auditing the media material; selecting a target display terminal; receiving program parameter information inputted by the user, the program parameter information including at least one of an identifier of the media material, a broadcasting start time, a broadcasting end time, a loop mode, a broadcasting start date, a broadcasting end date, a program priority level, a download mode of the media material or a scheduled download start time; generating information about a target program in accordance with the program parameter information and a display parameter of the target display terminal, the information about the target program including program information and plan information, the program information being used to indicate information about the media material in the program, and the plan information being used to indicate a broadcasting mode of the program; and transmitting the information about the target program to the target display terminal.

In a possible embodiment of the present disclosure, the plan information includes at least one of a program name, a broadcasting time period, the loop mode, the program priority level, the download mode of the media material, or the scheduled download start time; and the program information includes at least one of the identifier of the media material, a download address of the media material, a broadcasting frequency of the media material, or a broadcasting order of the media materials.

In a possible embodiment of the present disclosure, prior to transmitting the information about the target program to the target display terminal, the method further includes at least one of: detecting whether there is a time conflict with respect to the information about the target program; detecting a priority level with respect to the information about the target program; verifying a program broadcasting order with respect to the information about the target program; or verifying a program broadcasting frequency with respect to the information about the target program.

In a possible embodiment of the present disclosure, the auditing the media material includes: identifying attribute information about the media material, and determining a type of the media material in accordance with the attribute information about the media material; determining whether the media material includes illegal content in accordance with a deep learning model corresponding to the type of the media material, the deep learning model being obtained through training in accordance with a predetermined media material rule base; and when the media material does not include the illegal content, determining that the media material has passed an audit successfully.

In a possible embodiment of the present disclosure, the method further includes: receiving marked content for the media material that is inputted by the user and fails to pass the audit; and performing feature extraction on the marked content, and storing an extracted feature in the media material rule base.

In a possible embodiment of the present disclosure, the type of the media material includes at least one of a text, a video, an audio, a picture, a web page, a document, or a live broadcast stream.

In another aspect, the present disclosure further provides in some embodiments a program broadcasting method for a display terminal, including: receiving information about a target program from a server, the information about the target program including program information and plan information, the program information being used to indicate information about a media material in a program, and the plan information being used to indicate a broadcasting mode of the program; and obtaining the media material in accordance with the program information, and broadcasting the media material in accordance with the plan information.

In a possible embodiment of the present disclosure, the plan information includes at least one of a program name, a broadcasting time period, a loop mode, a program priority level, a download mode of the media material, or a scheduled download start time; and the program information includes at least one of an identifier of the media material, a download address of the media material, a broadcasting frequency of the media material, and a broadcasting order of the media materials.

In a possible embodiment of the present disclosure, the plan information includes the program priority level and the broadcasting time period, and when there is a conflict between broadcasting time periods of different target programs, a target program with a higher program priority level is broadcasted preferentially.

In yet another aspect, the present disclosure provides in some embodiments a program generation device for a server, including: an auditing module configured to obtain a media material uploaded by a user and andit the media material; a selection module configured to select a target display terminal; a reception module configured to receive program parameter information inputted by the user, and the program parameter information including at least one of an identifier of the media material, a broadcasting start time, a broadcasting end time, a loop mode, a broadcasting start date, a broadcasting end date, a program priority level, a download mode of the media material or a scheduled download start time; a generation module configured to generate information about a target program in accordance with the program parameter information and a display parameter of the target display terminal, the information about the target program including program information and plan information, the program information being used to indicate information about the media material in a program, and the plan information being used to indicate a broadcasting mode of the program; and a transmission module configured to transmit the information about the target program to the target display terminal.

In a possible embodiment of the present disclosure, the plan information includes at least one of a program name, a broadcasting time period, the loop mode, the program priority level, the download mode of the media material, or the scheduled download start time; and the program information includes at least one of the identifier of the media material, a download address of the media material, a broadcasting frequency of the media material, or a broadcasting order of the media materials.

In a possible embodiment of the present disclosure, the program generation device further includes a detection module configured to perform at least one of: detecting whether there is a time conflict with respect to the information about the target program; detect a priority level with respect to the information about the target program; verifying a program broadcasting order with respect to the information about the target program; and verifying a program broadcasting frequency with respect to the information about the target program.

In a possible embodiment of the present disclosure, the auditing module is specifically configured to: identify attribute information about the media material, and determine a type of the media material in accordance with the attribute information about the media material; determine whether the media material includes illegal content in accordance with a deep learning model corresponding to the type of the media material, the deep learning model being obtained through training in accordance with a predetermined media material rule base; and when the media material does not include the illegal content, determine that the media material has passed an audit successfully.

In a possible embodiment of the present disclosure, the auditing module is further configured to: receive marked content for the media material that is inputted by the user and fails to pass the audit; and perform feature extraction on the marked content, and store an extracted feature in the media material rule base.

In a possible embodiment of the present disclosure, the type of the media material includes at least one of a text, a video, an audio, a picture, a web page, a document, or a live broadcast stream.

In still yet another aspect, the present disclosure provides in some embodiments a program broadcasting device for a display terminal, including: an information reception module configured to receive information about a target program from a server, the information about the target program including program information and plan information, the program information being used to indicate information about a media material in a program, and the plan information being used to indicate a broadcasting mode of the program; and a broadcasting module configured to obtain the media material in accordance with the program information and broadcast the media material in accordance with the plan information.

In a possible embodiment of the present disclosure, the plan information includes at least one of a program name, a broadcasting time period, a loop mode, a program priority level, a download mode of the media material, or a scheduled download start time; and the program information includes at least one of an identifier of the media material, a download address of the media material, a broadcasting frequency of the media material, or a broadcasting order of the media materials.

In a possible embodiment of the present disclosure, the plan information includes the program priority level and the broadcasting time period, and when there is a conflict between broadcasting time periods of different target programs conflict, the broadcasting module is configured to preferentially broadcast a target program with a higher program priority level.

In still yet another aspect, the present disclosure provides in some embodiments a program generation device, including a processor and a memory storing therein a program or instruction. The program or the instruction is executed by the processor so as to implement the steps in the above-mentioned program generation method.

In still yet another aspect, the present disclosure provides in some embodiments a program broadcasting device, including a processor and a memory storing therein a program or instruction. The program or the instruction is executed by the processor so as to implement the steps in the above-mentioned program broadcasting method.

In still yet another aspect, the present disclosure provides in some embodiments a program generation system, including a server and a display terminal. The server includes the above-mentioned program generation device and the display terminal includes the above-mentioned program broadcasting device.

The present disclosure has the following beneficial effects.

According to the embodiments of the present disclosure, the server generates information about the target program in accordance with the media material uploaded by the user and the program parameter information, and transmits the information about the target program to the target display terminal, so as to enable the target display terminal to broadcast the target program in accordance with the information about the target program. As a result, it is able to generate the program without any manual operation, thereby to remarkably improve the program production efficiency.

BRIEF DESCRIPTION OF THE DRAWINGS

FIG. 1 is a flow chat of a program generation method according to one embodiment of the present disclosure;

FIG. 2 is a flow chat of a program broadcasting method according to one embodiment of the present disclosure;

FIG. 3 is a block diagram of a program generation device according to one embodiment of the present disclosure; and FIG. 4 is a block diagram of a program broadcasting device according to one embodiment of the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments.

An object of the present disclosure is to provide a program generation method, a program broadcasting method, a program generation device, a program broadcasting device and a program generation system, so as to increase the program production efficiency.

The present disclosure provides in some embodiments a program generation method for a server which, as shown in FIG. 1, includes the following steps.

Step 101: obtaining a media material uploaded by a user, and auditing the media material.

In the embodiments of the present disclosure, the server exhibits an uploading interface to the user, the user uploads the media material through the uploading interface, and the server audits the media material automatically after the media material has been uploaded successfully. The media material includes, but limited to, a text, a video, an audio, a picture, a web page, a document, and a live broadcast stream.

Before the generation of the program, it is necessary to audit content of the media material and determine whether the media material includes illegal content. When the media material does not include the illegal content, the media material is determined to have passed an audit successfully.

To be specific, attribute information about the media material is identified, and then a type of the media material is determined in accordance with the attribute information about the media material. Next, whether the media material includes the illegal content is determined in accordance with a deep learning model corresponding to the type of the media material, and the deep learning model is obtained through training in accordance with a predetermined media material rule base. When the media material does not include the illegal content, the media material is determined to have passed the audit successfully.

After the user has uploaded the media material, the attribute information about the media material is extracted automatically, and then the type of the media material is determined in accordance with the attribute information about the media material. The attribute information about the media material includes an extension name of the media material and a live broadcast protocol, and the type of the media material is determined in accordance with the extension name of the media material and the live broadcast protocol. As shown in Table 1, when an extracted extension name of the media material is txt, the type of the media material is determined as a text; when the extracted extension name of the media material is one of mpg/mpeg, avi, asf, wmv, m2t, m2v, mp4, Mov, 3gp, flv, Vob, iso, Mkv, rm/rmvb, ts, ps, webm, dat, ogg, ogm or SWF, the type of the media material is determined as a video; when the extracted extension name of the media material is one of MP3, WMA, WAV, AAC (.m4a/.mp4/.3gp), Vorbis (.ogg), AC3, Mod (.s3m/.mod), FLAC, ALAC, APE, MP2, MPC, TrueHD, DTS or DDP (EAC3), the type of the media material is determined as an audio; when the extracted extension name of the media material is one of JPG, BMP, PNG, JEPG, GIF or TIFF, the type of the media material is determined as a picture; when the extracted extension name of the media material is ZIP or html, the type of the media material is determined as a web page; when the extracted extension name of the media material is one of doc, docx, xls, xlsx, ppt, pptx or pdf, the type of the media material is determined as a document; and when the live broadcast protocol of the media material is one of RTSP, RTMP, HTTP-FLV or HLS, the type of the media material is determined as a live broadcast stream.

TABLE 1

| Number | Type | Determination mode | Format |
|---|---|---|---|
| 1 | text | extension | txt |
| 2 | video | extension | mpg/mpeg, avi, asf, wmv, m2t, m2v, mp4, Mov, 3gp, flv, Vob, iso, Mkv, rm/rmvb, ts, ps, webm, dat, ogg, ogm, SWF |
| 3 | audio | extension | MP3, WMA, WAV, AAC (.m4a/.mp4/.3gp), Vorbis (.ogg), AC3, Mod (.s3m/.mod), FLAC, ALAC, APE, MP2, MPC, TrueHD, DTS, DDP (EAC3) |
| 4 | picture | extension | JPG, BMP, PNG, JEPG, GIF, TIFF |
| 5 | web page | extension | ZIP, html |
| 6 | document | extension | doc, docx, xls, xlsx, ppt, pptx, pdf |
| 7 | live broadcast stream | live broadcast protocol | RTSP, RTMP, HTTP-FLV, HLS |

A media material rule base corresponding to each type of media material is established in advance. The media material rule base includes media material samples marked manually as to include or not include illegal content. A deep learning model is trained through the media material samples, so as to determine whether a media material sample includes the illegal content. When the media material sample includes the illegal content, the media material sample is determined to fail to pass the audit, and when the media material sample does not include the illegal content, the media material sample is determined to have passed the audit successfully.

In order to further improve the determination accuracy, marked content for the media material that is inputted by the user and fails to pass the audit is received, feature extraction is performed on the marked content, and then an extracted feature is stored in the media material rule base. In the embodiments of the present disclosure, the media material that is determined to fail to pass the audit is audited manually again, the media material audited manually is marked and added into the corresponding media material rule base, and then the deep learning model is trained again through the updated media material rule base. The deep learning model is trained every time the media material rule base is updated; or the deep learning model is trained periodically, e.g., every five hours or ten hours.

In addition, after the user has uploaded the media material related to a brand, when the uploaded media material is a picture, an Optical Character Recognition (OCR) technology is used to recognize logo information in the picture, and after the extraction of the logo information, the logo information is compared with a pre-stored brand library information to determine the brand. When the uploaded media material is a video, frame extraction is performed on the video, and then the brand is determined in a way similar to the picture.

Step 102: selecting a target display terminal.

The server selects one target display terminal or a plurality of target display terminals. When the server selects a plurality of target display terminals, display parameters of the plurality of target display terminals, e.g., resolution and aspect ratio, are the same, so as to achieve a better display effect. The target display terminal includes an LED display terminal or an LCD display terminal in such an all-media control scenario as airports, subways and high-speed railway platforms.

Step 103: receiving program parameter information inputted by the user, the program parameter information including at least one of an identifier of the media material, a broadcasting start time, a broadcasting end time, a loop mode, a broadcasting start date, a broadcasting end date, a program priority level, a download mode of the media material or a scheduled download start time.

In the embodiments of the present disclosure, the server exhibits a media material selection interface to the user, the user selects the media material in the target program through the media material selection interface, and the media material in the target program must be a media material that has passed the audit successfully. The user may add a plurality of media materials at once, a media material list is displayed in a predetermined region of the media material selection interface, e.g., at a left side of the media material selection interface, and the user adds the media materials through clicking the media materials in the media material list. When a media material to be added is not displayed in the media material list at the left side, a conditional screening search is performed in a search box of the media material selection interface, so as to select and add the media material.

After the user has selected the media material, a program parameter information input interface is exhibited to the user, and the program parameter information is customized by the user. The program parameter information includes at least one of an identifier of the media material, a broadcasting start time, a broadcasting end time, a loop mode, a broadcasting start date, a broadcasting end date, a program priority level, a download mode of the media material or a scheduled download start time.

The identifier of the media material is used to indicate a media material uniquely. After the user has selected a media material, its identifier is unalterable. The user may also input a name of the target program. When the user does not input any name of the target program, a name of the target program is generated automatically so as to indicate the target program uniquely.

The broadcasting start time is a time when the media material starts to be broadcast, in a format of 00:00:01. For example, when the broadcasting start time is 12:29:30, it means that the media material is to be broadcast at 12:29:30 every day. The broadcasting end time is a time when the media material is ended, in a format of 00:00:01. For example, when the broadcasting end time is 12:59:30, it means that the media material is ended at 12:59:30 every day. The broadcasting start date is a date when the media material starts to be broadcast, in a format of 0000-00-00. For example, when the broadcasting start date is 2014-04-18, it means that the media material is to be broadcast on Apr. 18, 2014. The broadcasting end date is a date when the media material is ended, in a format of 0000-00-00. For example, when the broadcasting end date is 2014-09-18, it means that the media material is ended on Sep. 18, 2014. The broadcasting time period of the media material is determined in accordance with the broadcasting start time, the broadcasting end time, the broadcasting start date and the broadcasting end date. For example, when the broadcasting start time is 12:29:30, the broadcasting end time is 12:59:30, the broadcasting start date is 2014-04-18 and the broadcasting end date is 2014-09-18, the broadcasting time period of the media material is from 12:29:30 to 12:59:30 on Apr. 18, 2014 to Sep. 18, 2014.

The loop mode includes single broadcasting and loop broadcasting. In the single broadcasting mode, the media material is merely broadcast once in the broadcasting time period, and in the loop broadcasting mode, the media material is broadcast in a loop manner until the end of the broadcasting time period.

The program priority level is a broadcasting priority level of the target program. For example, when there is a conflict between broadcasting time periods of a plurality of target programs, a target program with a higher program priority level is broadcast preferentially in accordance with the program priority level. A plurality of program priority levels, e.g., 9 or 11 program priority levels, is set in advance, and the user may select one priority level as a program priority level of the target program.

The download mode of the media material includes scheduled download and instant download. In the scheduled download mode, the media material in the target program is downloaded at a scheduled time, i.e., upon the receipt of the program information and the plan information from the server, the display terminal immediately starts to download the program information, the plan information and the media material and locally store them. In the instant download mode, the media material is downloaded immediately after a download address of the media material has been obtained, i.e., the server notifies the display terminal to download the media material, and upon the receipt of the program information and the plan information from the server, the display terminal immediately starts to download the program information, the plan information and the media material and locally store them.

The scheduled download start time is a time when the media material starts to be downloaded in the scheduled download mode, in a format of 0000-00-00. 00:00:01. For example, when the scheduled download start time is 2021-04-18, 12:29:30, it means that the media material is downloaded at 12:29:30 on Apr. 18, 2021.

To be specific, the server may exhibit Table 2 to the user, and the user may input corresponding content to generate a target program.

TABLE 2

| Number | Identifier | Duration (s) | Start time | End time | Loop mode | Start date | End date | Download mode | Download start time |
|---|---|---|---|---|---|---|---|---|---|
| 0 | 68ad8d | 5 | | | | | | | |
| 1 | Playing basketball | 15 | | | | | | | |

TABLE 2-continued

| Num-ber | Identifier | Duration (s) | Start time | End time | Loop mode | Start date | End date | Download mode | Download start time |
|---------|-----------|-------------|-----------|----------|-----------|-----------|----------|---------------|-------------------|
| 2 | Titancil | 203 | | | | | | | |
| 3 | Playing basketball | 31 | | | | | | | |

The identifier of the media material is a name of a media material that is selected by the user and has passed the audit successfully, and the identifier of each media material is unalterable. In Table 2, an order and a frequency of the media materials may be adjusted, and in the target program, the media materials may be broadcast in the order of the media materials in Table 2. In a possible embodiment of the present disclosure, as shown in Table 2, such media materials as 68ad8d, playing basketball, Titancil and playing basketball in the target program need to be broadcast in sequence, and the playing basketball appears twice, i.e., after 68ad8d and after Titancil.

Description about each column in Table 2 is shown in Table 3.

TABLE 3

| Table header | Format | Whether to support filling in multiple lines |
|-------------|--------|---------------------------------------------|
| Name of target program | The name may be left blank, and at this time, the name is automatically generated | No |
| Broadcasting start time (format: 00:00:01) | 00:00:01 | Yes |
| Broadcasting end time (format: 00:00:01) | 00:00:01 | Yes |
| Loop mode | There are only two options, including a single broadcasting mode where the media material is broadcast for one time, and a loop broadcasting mode where the media material is broadcast in a loop manner from the broadcasting start time to the broadcasting end time | No |
| Broadcasting start date | 2021 Apr. 18 | No |
| Broadcasting end date | 2021 Apr. 18 | No |
| Program priority level | The program priority level is selected form 9 or 11 program priority levels | No |
| Download mode of media material | There are only two options, including an instant download mode and a scheduled download mode | No |
| Scheduled download start time | 2021 Apr. 18, 00:00:01; when the scheduled download mode 1S selected, the scheduled download start time needs to be filled | No |

In addition, the program parameter information further includes layout information about the media material, and the layout information about the media material includes a position and a size of the media material.

An interface of the target program is used to display one media material or a plurality of media materials within a certain time period. An arrangement mode of one or more media materials on the interface is typesetting information about the program. To be specific, a plurality of pieces of typesetting information is provided to the user in advance, and the user selects one piece of the typesetting information according to the practical need. After the user has selected the typesetting information, the size of the media material may be automatically adjusted in response to the user's operation, so as to enable the size of the media material to match the typesetting selected by the user. In this regard, it is able to automatically adjust the size and position of the media material in accordance with the typesetting information, and generate the desired program without any necessity to change the size and the position of the media material, thereby to increase program production efficiency.

In a possible embodiment of the present disclosure, there are at least two media materials, and one of the media materials is a target media material. In response to the size adjustment on the target media material, a size of the other media material in the target program except the target media material is adjusted correspondingly so that a size change of the other media material is the same as a size change of the target media material. The at least two media materials may be, but not limited to, pictures or texts, or a part of the media materials are, but not limited to, pictures and the remaining media materials are, but not limited to, texts. For example, two media materials in the target program specifically include a text and a picture, and the text is located on the picture. After the user has adjusted a size of the picture, the server automatically adjusts a size of the text in accordance with a size change of the picture, so that a size change of the text is the same as the size change of the picture. In this way, it is able to reduce a workload and increase the program production efficiency. It should be appreciated that, when the size changes are the same, it means that, for example, scaling ratios of the media materials are the same.

In addition, in the embodiments of the present disclosure, a user's preference and a habitual style are determined through analyzing a historical program produced by each user, so as to adjust a program layout, and output the corresponding program layout in accordance with the user's preference and habitual style, and thereby to improve the user experience. For example, a character picture is arranged above a text in a historical program, and when the user selects a character picture and inputs a text, a program is produced in accordance with the layout where the picture is arranged above the text. For example, three options are provided for the user, i.e., an option A where the picture is arranged on the top and occupies 80% of an area of a screen and the text is arranged on the bottom and occupies 20% of the area, an option B where the picture is arranged on the top and occupies 70% of the area and the text is arranged on the bottom and occupies 30% of the area, and an option C where the picture is arranged on the top and occupies 60% of the area and the text is arranged on the bottom and occupies 40% of the area. In this way, it is able to improve the user experience.

Step 104: generating information about a target program in accordance with the program parameter information and a display parameter of the target display terminal, the information about the target program including program information and plan information, the program information being used to indicate information about the media material in the program, and the plan information being used to indicate a broadcasting mode of the program.

After the user has inputted the program parameter information, the information about the target program is generated in accordance with the program parameter information and the display parameter of the target display terminal, and the information about the target program includes the program information and the plan information.

Prior to transmitting the information about the target program to the target display terminal, the target program may also be verified. After the target program has been verified successfully, the target program is transmitted to the target display terminal.

The verifying the target program includes at least one of: detecting whether there is a time conflict with respect to the information about the target program; detecting a priority level with respect to the information about the target program; verifying a program broadcasting order with respect to the information about the target program; and verifying a program broadcasting frequency with respect to the information about the target program.

Through verifying the target program, it is able for the target display terminal to broadcast the target program, and prevent the occurrence of such a situation where the target display terminal does not broadcast the target program smoothly upon the receipt of the information about the target program.

In addition, when the target program is an advertisement, the target program may also be subjected to brand mutual exclusion detection. To be specific, a database for brand mutual exclusion is maintained at the server, and whether there is a mutual exclusion between a brand involved in the target program and a brand in the previous-published program in accordance with the database. When there is the mutual exclusion, the target program is deemed to fail to pass the audit.

Step 105: transmitting the information about the target program to the target display terminal.

The plan information includes at least one of a program name, a broadcasting time period, the loop mode, the program priority level, the download mode of the media material, or the scheduled download start time.

The name and the broadcasting time period of the target program are obtained by the display terminal in accordance with the program information, and then the target program is broadcast within the broadcasting time period. The loop mode includes a single broadcasting mode and a loop broadcasting mode. In the single broadcasting mode, the target program is broadcast for once within the broadcasting time period, and in the loop broadcasting mode, the target program is broadcast in a loop mode until the end of the broadcasting time period.

The program priority level is a broadcasting priority level of the target program. For example, when there is a conflict between the broadcasting time periods of a plurality of target programs, a target program with a higher program priority level is broadcast preferentially in accordance with the program priority level. For example, when the broadcasting time periods of two target programs overlap with each other, one target program has a program priority level of 8 and the other target program has a program priority level of 1, the target program with the program priority level of & may be broadcast preferentially.

The download mode of the media material includes scheduled download and instant download. In the scheduled download mode, the media material in the target program is downloaded at a scheduled time, i.e., upon the receipt of the program information and the plan information from the server, the display terminal immediately starts to download the program information, the plan information and the media material and locally store them. In the instant download mode, the media material is downloaded immediately after a download address of the media material has been obtained, i.e., the server notifies the display terminal to download the media material, and upon the receipt of the program information and the plan information from the server, the display terminal immediately starts to download the program information, the plan information and the media material and locally store them.

The scheduled download start time is a time when the media material starts to be downloaded in the scheduled download mode, in a format of 0000-00-00. 00:00:01. For example, when the scheduled download start time is 2021-04-18, 12:29:30, it means that the media material is downloaded at 12:29:30 on Apr. 18, 2021.

The program information includes at least one of the identifier of the the media material, or a broadcasting order of the media materials.

The target display terminal determines a media material in the target program through the media material identifier, downloads the media material through the download address of the media material and the download mode of the media material, determines how to broadcast the media material in the target program in accordance with the broadcasting frequency of the media material and the broadcasting order of the media materials, and then broadcasts the target program in accordance with the broadcasting frequency of the media material and the broadcasting order of the media materials.

According to the embodiments of the present disclosure, the server generates information about the target program in accordance with the media material uploaded by the user and the program parameter information, and transmits the information about the target program to the target display terminal, so as to enable the target display terminal to broadcast the target program in accordance with the information about the target program. As a result, it is able to generate the program without any manual operation, thereby to remarkably improve the program production efficiency.

The method in the embodiments of the present disclosure may be applied to all-media control scenarios, the target display terminal includes an LED display terminal or an LCD display terminal in such scenarios as airports, subways and high-speed railway platforms, and the target program is an advertisement or promotional video.

The present disclosure further provides in some embodiments a program broadcasting method for a display terminal which, as shown in FIG. 2, includes: Step 201 of receiving information about a target program from a server, the information about the target program including program information and plan information, the program information being used to indicate information about a media material in the program, and the plan information being used to indicate a broadcasting mode of the program; and Step 202 of obtaining the media material in accordance with the program information, and broadcasting the media material in accordance with the plan information.

The plan information includes at least one of a program name, a broadcasting time period, a loop mode, a program priority level, a download mode of the media material, or a scheduled download start time.

The name and the broadcasting time period of the target program are obtained by the display terminal in accordance with the program information, and then the target program is broadcast within the broadcasting time period. The loop mode includes a single broadcasting mode and a loop broadcasting mode. In the single broadcasting mode, the target program is broadcast for once within the broadcasting time period, and in the loop broadcasting mode, the target program is broadcast in a loop mode until the end of the broadcasting time period.

The program priority level is a broadcasting priority level of the target program. For example, when there is a conflict between the broadcasting time periods of a plurality of target programs, a target program with a higher program priority level is broadcast preferentially. For example, when the broadcasting time periods of two target programs overlap with each other, one target program has a program priority level of 8 and the other target program has a program priority level of 1, the target program with the program priority level of 8 may be broadcast preferentially.

The download mode of the media material includes scheduled download and instant download. In the scheduled download mode, the media material in the target program is downloaded at a scheduled time, i.e., upon the receipt of the program information and the plan information from the server, the display terminal immediately starts to download the program information, the plan information and the media material and locally store them. In the instant download mode, the media material is downloaded immediately after a download address of the media material has been obtained, i.e., the server notifies the display terminal to download the media material, and upon the receipt of the program information and the plan information from the server, the display terminal immediately starts to download the program information, the plan information and the media material and locally store them.

The scheduled download start time is a time when the media material starts to be downloaded in the scheduled download mode, in a format of 0000-00-00. 00:00:01. For example, when the scheduled download start time is 2021-04-18, 12:29:30, it means that the media material is downloaded at 12:29:30 on Apr. 18, 2021.

The program information includes at least one of an identifier of the media material, a download address of the media material, a broadcasting frequency of the media material, or a broadcasting order of the media materials.

The target display terminal determines a media material in the target program through the media material identifier, downloads the media material through the download address of the media material and the download mode of the media material, determines how to broadcast the media material in the target program in accordance with the broadcasting frequency of the media material and the broadcasting order of the media materials, and then broadcasts the target program in accordance with the broadcasting frequency of the media material and the broadcasting order of the media materials.

The method in the embodiments of the present disclosure may be applied to all-media control scenarios, the target display terminal includes an LED display terminal or an LCD display terminal in such scenarios as airports, subways and high-speed railway platforms, and the target program is an advertisement or promotional video.

The present disclosure further provides in some embodiments a program generation device for a server which, as shown in FIG. 3, includes: an auditing module 31 configured to obtain a media material uploaded by a user and audit the media material; a selection module 32 configured to select a target display terminal; a reception module 33 configured to receive program parameter information inputted by the user, and the program parameter information including at least one of an identifier of the media material, a broadcasting start time, a broadcasting end time, a loop mode, a broadcasting start date, a broadcasting end date, a program priority level, a download mode of the media material or a scheduled download start time; a generation module 34 configured to generate information about a target program in accordance with the program parameter information and a display parameter of the target display terminal, the information about the target program including program information and plan information, the program information being used to indicate information about the media material in a program, and the plan information being used to indicate a broadcasting mode of the program; and a transmission module 35 configured to transmit the information about the target program to the target display terminal.

In the embodiments of the present disclosure, the server exhibits an uploading interface to the user, the user uploads the media material through the uploading interface, and the server audits the media material automatically after the media material has been uploaded successfully. The media material includes, but limited to, a text, a video, an audio, a picture, a web page, a document, and a live broadcast stream.

Before the generation of the program, it is necessary to audit content of the media material and determine whether the media material includes illegal content. When the media material does not include the illegal content, the media material is determined to have passed an audit successfully.

To be specific, attribute information about the media material is identified, and then a type of the media material is determined in accordance with the attribute information about the media material. Next, whether the media material includes the illegal content is determined in accordance with a deep learning model corresponding to the type of the media material, and the deep learning model is obtained through training in accordance with a predetermined media material rule base. When the media material does not include the illegal content, the media material is determined to have passed the audit successfully.

After the user has uploaded the media material, the attribute information about the media material is extracted automatically, and then the type of the media material is determined in accordance with the attribute information about the media material. The attribute information about the media material includes an extension name of the media material and a live broadcast protocol, and the type of the media material is determined in accordance with the extension name of the media material and the live broadcast protocol. As shown in Table 1, when an extracted extension name of the media material is txt, the type of the media material is determined as a text; when the extracted extension name of the media material is one of mpg/mpeg, avi, asf, wmv, m2t, m2v, mp4, Mov, 3gp, flv, Vob, iso, Mkv, rm/rmvb, ts, ps, webm, dat, ogg, ogm or SWF, the type of the media material is determined as a video; when the extracted extension name of the media material is one of MP3, WMA, WAV, AAC (.m4a/.mp4/.3gp), Vorbis (.ogg), AC3, Mod (.s3m/.mod), FLAC, ALAC, APE, MP2, MPC, TrueHD, DTS or DDP (EAC3), the type of the media material is determined as an audio; when the extracted extension name of the media material is one of JPG, BMP, PNG, JEPG, GIF or TIFF, the type of the media material is determined as a picture; when the extracted extension name of the media material is ZIP or html, the type of the media material is determined as a web page; when the extracted extension name of the media material is one of doc, docx, xls, xlsx, ppt, pptx or pdf, the type of the media material is determined as a document; and when the live broadcast protocol of the media material is one of RTSP, RTMP, HTTP-FLV or HLS, the type of the media material is determined as a live broadcast stream

TABLE 1

| Number | Type | Determination mode | Format |
|--------|------|------|--------|
| 1 | text | extension | txt |
| 2 | video | extension | mpg/mpeg, avi, asf, wmv, m2t, m2v, mp4, Mov, 3gp, flv, Vob, iso, Mkv, rm/rmvb, ts, ps, webm, dat, ogg, ogm, SWF |
| 3 | audio | extension | MP3, WMA, WAV, AAC (.m4a/.mp4/.3gp), Vorbis (.ogg), AC3, Mod (.s3m/.mod), FLAC, ALAC, APE, MP2, MPC, TrueHD, DTS, DDP (EAC3) |
| 4 | picture | extension | JPG, BMP, PNG, JEPG, GIF, TIFF |
| 5 | web page | extension | ZIP, html |
| 6 | document | extension | doc, docx, xls, xlsx, ppt, pptx, pdf |
| 7 | live broadcast stream | live broadcast protocol | RTSP, RTMP, HTTP-FLV, HLS |

A media material rule base corresponding to each type of media material is established in advance. The media material rule base includes media material samples marked manually as to include or not include illegal content. A deep learning model is trained through the media material samples, so as to determine whether a media material sample includes the illegal content. When the media material sample includes the illegal content, the media material sample is determined to fail to pass the audit, and when the media material sample does not include the illegal content, the media material sample is determined to have passed the audit successfully.

In order to further improve the determination accuracy, marked content for the media material that is inputted by the user and fails to pass the audit is received, feature extraction is performed on the marked content, and then an extracted feature is stored in the media material rule base. In the embodiments of the present disclosure, the media material that is determined to fail to pass the audit is audited manually again, the media material audited manually is marked and added into the corresponding media material rule base, and then the deep learning model is trained again through the updated media material rule base. The deep learning model is trained every time the media material rule base is updated; or the deep learning model is trained periodically, e.g., every five hours or ten hours.

In addition, after the user has uploaded the media material related to a brand, when the uploaded media material is a picture, an Optical Character Recognition (OCR) technology is used to recognize logo information in the picture, and after the extraction of the logo information, the logo information is compared with a pre-stored brand library information to determine the brand. When the uploaded media material is a video, frame extraction is performed on the video, and then the brand is determined in a way similar to the picture.

The server selects one target display terminal or a plurality of target display terminals. When the server selects a plurality of target display terminals, display parameters of the plurality of target display terminals, e.g., resolution and aspect ratio, are the same, so as to achieve a better display effect. The target display terminal includes an LED display terminal or an LCD display terminal in such an all-media control scenario as airports, subways and high-speed railway platforms.

In the embodiments of the present disclosure, the server exhibits a media material selection interface to the user, the user selects the media material in the target program through the media material selection interface, and the media material in the target program must be a media material that has passed the audit successfully. The user may add a plurality of media materials at once, a media material list is displayed in a predetermined region of the media material selection interface, e.g., at a left side of the media material selection interface, and the user adds the media materials through clicking the media materials in the media material list. When a media material to be added is not displayed in the media material list at the left side, a conditional screening search is performed in a search box of the media material selection interface, so as to select and add the media material.

After the user has selected the media material, a program parameter information input interface is exhibited to the user, and the program parameter information is customized by the user. The program parameter information includes at least one of an identifier of the media material, a broadcasting start time, a broadcasting end time, a loop mode, a broadcasting start date, a broadcasting end date, a program priority level, a download mode of the media material or a scheduled download start time.

The identifier of the media material is used to indicate a media material uniquely. After the user has selected a media material, its identifier is unalterable. The user may also input a name of the target program. When the user does not input any name of the target program, a name of the target program is generated automatically so as to indicate the target program uniquely.

The broadcasting start time is a time when the media material starts to be broadcast, in a format of 00:00:01. For example, when the broadcasting start time is 12:29:30, it means that the media material is to be broadcast at 12:29:30 every day. The broadcasting end time is a time when the media material is ended, in a format of 00:00:01. For example, when the broadcasting end time is 12:59:30, it means that the media material is ended at 12:59:30 every day. The broadcasting start date is a date when the media material starts to be broadcast, in a format of 0000-00-00. For example, when the broadcasting start date is 2014-04-18, it means that the media material is to be broadcast on Apr. 18, 2014. The broadcasting end date is a date when the media material is ended, in a format of 0000-00-00. For example, when the broadcasting end date is 2014-09-18, it means that the media material is ended on Sep. 18, 2014. The broadcasting time period of the media material is determined in accordance with the broadcasting start time, the broadcasting end time, the broadcasting start date and the broadcasting end date. For example, when the broadcasting start time is 12:29:30, the broadcasting end time is 12:59:30, the broadcasting start date is 2014-04-18 and the broadcasting end date is 2014-09-18, the broadcasting time period of the media material is from 12:29:30 to 12:59:30 on Apr. 18, 2014 to Sep. 18, 2014.

The loop mode includes single broadcasting and loop broadcasting. In the single broadcasting mode, the media material is merely broadcast once in the broadcasting time period, and in the loop broadcasting mode, the media material is broadcast in a loop manner until the end of the broadcasting time period.

The program priority level is a broadcasting priority level of the target program. For example, when there is a conflict between broadcasting time periods of a plurality of target programs, a target program with a higher program priority level is broadcast preferentially in accordance with the program priority level. A plurality of program priority levels, e.g., 9 or 11 program priority levels, is set in advance, and the user may select one priority level as a program priority level of the target program.

The download mode of the media material includes scheduled download and instant download. In the scheduled download mode, the media material in the target program is downloaded at a scheduled time, i.e., upon the receipt of the program information and the plan information from the server, the display terminal immediately starts to download the program information, the plan information and the media material and locally store them. In the instant download mode, the media material is downloaded immediately after a download address of the media material has been obtained, i.e., the server notifies the display terminal to download the media material, and upon the receipt of the program information and the plan information from the server, the display terminal immediately starts to download the program information, the plan information and the media material and locally store them.

The scheduled download start time is a time when the media material starts to be downloaded in the scheduled download mode, in a format of 0000-00-00. 00:00:01. For example, when the scheduled download start time is 2021-04- 18, 12:29:30, it means that the media material is downloaded at 12:29:30 on Apr. 18, 2021.

To be specific, the server may exhibit Table 2 to the user, and the user may input corresponding content to generate a target program.

TABLE 2

| Num-ber | Identifier | Duration (s) | Start time | End time | Loop mode | Start date | End date | Down-load mode | Down-load start time |
|---|---|---|---|---|---|---|---|---|---|
| 0 | 68ad8d | 5 | | | | | | | |
| 1 | Playing basketball | 15 | | | | | | | |
| 2 | Titanci1 | 203 | | | | | | | |
| 3 | Playing basketball | 31 | | | | | | | |

The identifier of the media material is a name of a media material that is selected by the user and has passed the audit successfully, and the identifier of each media material is unalterable. In Table 2, an order and a frequency of the media materials may be adjusted, and in the target program, the media materials may be broadcast in the order of the media materials in Table 2. In a possible embodiment of the present disclosure, as shown in Table 2, such media materials as 68ad8d, playing basketball, Titanci1 and playing basketball in the target program need to be broadcast in sequence, and the playing basketball appears twice, Le, after 68ad8d and after Titanci1.

Description about each column in Table 2 is shown in Table 3.

TABLE 3

| Table header | Format | Whether to support filling in multiple lines |
|---|---|---|
| Name of target program | The name may be left blank, and at this time, the name is automatically generated | No |
| Broadcasting start time (format: 00:00:01) | 00:00:01 | Yes |
| Broadcasting end time (format: 00:00:01) | 00:00:01 | Yes |
| Loop mode | There are only two options, including a single broadcasting mode where the media material is broadcast for one time, and a loop broadcasting mode where the media material is broadcast in a loop manner from the broadcasting start time to the broadcasting end time | No |
| Broadcasting start date | 2021 Apr. 18 | No |
| Broadcasting end date | 2021 Apr. 18 | No |
| Program priority level | The program priority level is selected form 9 or 11 program priority levels | No |
| Download mode of media material | There are only two options, including an instant download mode and a scheduled download mode | No |
| Scheduled download start time | 2021 Apr. 18, 00:00:01: when the scheduled download mode is selected, the scheduled download start time needs to be filled | No |

In addition, the program parameter information further includes layout information about the media material, and the layout information about the media material includes a position and a size of the media material.

An interface of the target program is used to display one media material or a plurality of media materials within a certain time period. An arrangement mode of one or more media materials on the interface is typesetting information about the program. To be specific, a plurality of pieces of typesetting information is provided to the user in advance, and the user selects one piece of the typesetting information according to the practical need. After the user has selected the typesetting information, the size of the media material may be automatically adjusted in response to the user's operation, so as to enable the size of the media material to match the typesetting selected by the user. In this regard, it is able to automatically adjust the size and position of the media material in accordance with the typesetting information, and generate the desired program without any necessity to change the size and the position of the media material, thereby to increase program production efficiency.

In a possible embodiment of the present disclosure, there are at least two media materials, and one of the media materials is a target media material. In response to the size adjustment on the target media material, a size of the other media material in the target program except the target media material is adjusted correspondingly so that a size change of the other media material is the same as a size change of the target media material. The at least two media materials may be, but not limited to, pictures or texts, or a part of the media materials are, but not limited to, pictures and the remaining media materials are, but not limited to, texts. For example, two media materials in the target program specifically include a text and a picture, and the text is located on the picture. After the user has adjusted a size of the picture, the server automatically adjusts a size of the text in accordance with a size change of the picture, so that a size change of the text is the same as the size change of the picture. In this way, it is able to reduce a workload and increase the program production efficiency. It should be appreciated that, when the size changes are the same, it means that, for example, scaling ratios of the media materials are the same.

In addition, in the embodiments of the present disclosure, a user's preference and a habitual style are determined through analyzing a historical program produced by each user, so as to adjust a program layout, and output the corresponding program layout in accordance with the user's preference and habitual style, and thereby to improve the user experience. For example, a character picture is arranged above a text in a historical program, and when the user selects a character picture and inputs a text, a program is produced in accordance with the layout where the picture is arranged above the text. For example, three options are provided for the user, i.e., an option A where the picture is arranged on the top and occupies 80% of an area of a screen and the text is arranged on the bottom and occupies 20% of the area, an option B where the picture is arranged on the top and occupies 70% of the area and the text is arranged on the bottom and occupies 30% of the area, and an option C where the picture is arranged on the top and occupies 60% of the area and the text is arranged on the bottom and occupies 40% of the area. In this way, it is able to improve the user experience.

After the user has inputted the program parameter information, the information about the target program is generated in accordance with the program parameter information and the display parameter of the target display terminal, and the information about the target program includes the program information and the plan information.

Prior to transmitting the information about the target program to the target display terminal, the target program may also be verified. After the target program has been verified successfully, the target program is transmitted to the target display terminal.

The verifying the target program includes at least one of: detecting whether there is a time conflict with respect to the information about the target program; detecting a priority level with respect to the information about the target program; verifying a program broadcasting order with respect to the information about the target program; and verifying a program broadcasting frequency with respect to the information about the target program.

Through verifying the target program, it is able for the target display terminal to broadcast the target program, and prevent the occurrence of such a situation where the target display terminal does not broadcast the target program smoothly upon the receipt of the information about the target program.

In addition, when the target program is an advertisement, the target program may also be subjected to brand mutual exclusion detection. To be specific, a database for brand mutual exclusion is maintained at the server, and whether there is a mutual exclusion between a brand involved in the target program and a brand in the previous-published program in accordance with the database. When there is the mutual exclusion, the target program is deemed to fail to pass the audit.

The plan information includes at least one of a program name, a broadcasting time period, the loop mode, the program priority level, the download mode of the media material, or the scheduled download start time.

The name and the broadcasting time period of the target program are obtained by the display terminal in accordance with the program information, and then the target program is broadcast within the broadcasting time period. The loop mode includes a single broadcasting mode and a loop broadcasting mode. In the single broadcasting mode, the target program is broadcast for once within the broadcasting time period, and in the loop broadcasting mode, the target program is broadcast in a loop mode until the end of the broadcasting time period.

The program priority level is a broadcasting priority level of the target program. For example, when there is a conflict between the broadcasting time periods of a plurality of target programs, a target program with a higher program priority level is broadcast preferentially in accordance with the program priority level. For example, when the broadcasting time periods of two target programs overlap with each other, one target program has a program priority level of 8 and the other target program has a program priority level of 1, the target program with the program priority level of 8 may be broadcast preferentially.

The download mode of the media material includes scheduled download and instant download. The scheduled download is to download the media material in the target program in accordance with scheduled time, and after the display terminal obtains the program information and the plan information from the server and reaches the scheduled time, the display terminal immediately starts to download the program information, the plan information and the media material to the local and stores them; the instant download means that the media material is downloaded immediately after a download address of the media material is obtained, and the server notifies the display terminal to download the media material, and after the display terminal obtains the program information and the plan information from the server, the display terminal immediately starts to download the program information, the plan information and the media material to the local and stores them.

The scheduled download start time is a time when the media material starts to be downloaded in the scheduled download mode, in a format of 0000-00-00. 00:00:01. For example, when the scheduled download start time is 2021-04-18, 12:29:30, it means that the media material is downloaded at 12:29:30 on Apr. 18, 2021.

The program information includes at least one of the identifier of the media material, a download address of the media material, a broadcasting frequency of the media material, or a broadcasting order of the media materials.

The target display terminal determines a media material in the target program through the media material identifier, downloads the media material through the download address of the media material and the download mode of the media material, determines how to broadcast the media material in the target program in accordance with the broadcasting frequency of the media material and the broadcasting order of the media materials, and then broadcasts the target program in accordance with the broadcasting frequency of the media material and the broadcasting order of the media materials.

According to the embodiments of the present disclosure, the server generates information about the target program in accordance with the media material uploaded by the user and the program parameter information, and transmits the information about the target program to the target display terminal, so as to enable the target display terminal to broadcast the target program in accordance with the information about the target program. As a result, it is able to generate the program without any manual operation, thereby to remarkably improve the program production efficiency.

The device in the embodiments of the present disclosure may be applied to all-media control scenarios, the target display terminal includes an LED display terminal or an LCD display terminal in such scenarios as airports, subways and high-speed railway platforms, and the target program is an advertisement or promotional video.

The present disclosure further provides in some embodiments a program generation device for a display terminal which, as shown in FIG. 4, includes: an information reception module 41 configured to receive information about a target program from a server, the information about the target program including program information and plan information, the program information being used to indicate information about a media material in a program, and the plan information being used to indicate a broadcasting mode of the program; and a broadcasting module 42 configured to obtain the media material in accordance with the program information and broadcast the media material in accordance with the plan information.

The plan information includes at least one of a program name, a broadcasting time period, a loop mode, a program priority level, a download mode of the media material, or a scheduled download start time.

The name and the broadcasting time period of the target program are obtained by the display terminal in accordance with the program information, and then the target program is broadcast within the broadcasting time period. The loop mode includes a single broadcasting mode and a loop broadcasting mode. In the single broadcasting mode, the target program is broadcast for once within the broadcasting time period, and in the loop broadcasting mode, the target program is broadcast in a loop mode until the end of the broadcasting time period.

The program priority level is a broadcasting priority level of the target program. For example, when there is a conflict between the broadcasting time periods of a plurality of target programs, a target program with a higher program priority level is broadcast preferentially in accordance with the program priority level. For example, when the broadcasting time periods of two target programs overlap with each other, one target program has a program priority level of 8 and the other target program has a program priority level of 1, the target program with the program priority level of 8 may be broadcast preferentially.

The download mode of the media material includes scheduled download and instant download. In the scheduled download mode, the media material in the target program is downloaded at a scheduled time, e.g., at 9:00 every day. In the instant download mode, the media material is downloaded immediately after a download address of the media material has been obtained.

The scheduled download start time is a time when the media material starts to be downloaded in the scheduled download mode, in a format of 00:00:01. For example, when the scheduled download start time is 12:29:30, it means that the media material is downloaded at 12:29:30 every day.

The program information includes at least one of an identifier of the media material, a download address of the media material, a broadcasting frequency of the media material, or a broadcasting order of the media materials.

The target display terminal determines a media material in the target program through the media material identifier, downloads the media material through the download address of the media material and the download mode of the media material, determines how to broadcast the media material in the target program in accordance with the broadcasting frequency of the media material and the broadcasting order of the media materials, and then broadcasts the target program in accordance with the broadcasting frequency of the media material and the broadcasting order of the media materials.

The device in the embodiments of the present disclosure may be applied to all-media control scenarios, the target display terminal includes an LED display terminal or an LCD display terminal in such scenarios as airports, subways and high-speed railway platforms, and the target program is an advertisement or promotional video.

The present disclosure further provides in some embodiments a program generation device, which includes a processor and a memory storing therein a program or instruction. The program or the instruction is executed by the processor so as to implement the steps in the above-mentioned program generation method.

The present disclosure further provides in some embodiments a program broadcasting device, which includes a processor and a memory storing therein a program or instruction. The program or the instruction is executed by the processor so as to implement the steps in the above-mentioned program broadcasting method.

The present disclosure further provides in some embodiments a program generation system, which includes a server and a display terminal. The server includes the above-mentioned program generation device and the display terminal includes the above-mentioned program broadcasting device.

In the embodiments of the present disclosure, the order of the steps is not limited to the serial numbers thereof. For a person skilled in the art, any change in the order of the steps shall also fall within the scope of the present disclosure if without any creative effort.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements. It should be further appreciated that, apart from the described or discussed order, the steps may also be performed simultaneously or in a reverse order, so as to achieve the mentioned functions. For example, new steps may be added, or some steps may be omitted or combined. In addition, the features described with reference to some embodiments may be combined in the other embodiments.

Through the above description, a person skilled in the art may clearly understand that the methods in the above embodiments may be implemented by means of software and a necessary general hardware platform. Based on this, the technical solutions of the present disclosure, partial or full, or parts of the technical solutions of the present disclosure contributing to the related art, may appear in the form of software products, which may be stored in a storage medium (such as an ROM/RAM, a magnetic disk or an optical disk) and include several instructions so as to enable a terminal (a mobile phone, a computer, a server, an air conditioner, or a network device) to execute all or parts of the steps of the method according to the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A program generation method performed by a server, comprising:

obtaining a media material uploaded by a user, and auditing the media material;

selecting a target display terminal from a plurality of display terminals;

receiving program parameter information inputted by the user, the program parameter information comprising at least one of an identifier of the media material, a broadcasting start time, a broadcasting end time, a loop mode, a broadcasting start date, a broadcasting end date, a program priority level, a download mode of the media material or a scheduled download start time;

generating information about a target program in accordance with the program parameter information and a display parameter of the target display terminal, the information about the target program comprising program information and plan information, the program information being used to indicate information about the media material in the program, and the plan information being used to indicate a broadcasting mode of the program; and transmitting the information about the target program to the target display terminal, wherein the plan information comprises the download mode of the media material, the download mode of the media material comprising one of scheduled download and instant download, wherein the scheduled download refers to that after the receipt of the program information and the plan information from the server, the display terminal starts to download the media material at a scheduled time, and the instant download refers to that upon the receipt of the program information and the plan information from the server, the display terminal immediately starts to download the media material, wherein prior to transmitting the information about the target program to the target display terminal, the method further comprises at least one of:

detecting whether there is a time conflict with respect to the information about the target program; and verifying a program broadcasting order with respect to the information about the target program, and wherein the auditing of the media material comprises:

identifying attribute information about the media material, and determining a type of the media material in accordance with the attribute information about the media material;

determining whether the media material comprises illegal content in accordance with a deep learning model corresponding to the type of the media material, the deep learning model corresponding to the type of the media material being obtained through training in accordance with a predetermined media material rule base corresponding to the type of the media material; and when the media material does not comprise the illegal content, determining that the media material has passed an audit successfully.

2. The program generation method according to claim 1, wherein the plan information further comprises at least one of a program name, a broadcasting time period, the loop mode, the program priority level, or the scheduled download start time; and the program information comprises at least one of the identifier of the media material, a download address of the media material, a broadcasting frequency of the media material, or a broadcasting order of the media materials.

3. The program generation method according to claim 1, further comprising:

receiving marked content for the media material that is inputted by the user and fails to pass the audit; and performing feature extraction on the marked content, and storing an extracted feature in the media material rule base.

4. The program generation method according to claim 1, wherein the type of the media material comprises at least one of a text, a video, an audio, a picture, a web page, a document, or a live broadcast stream.

5. A program broadcasting method performed by a display terminal, comprising:

receiving information about a target program from a server, the information about the target program comprising program information and plan information, the program information being used to indicate information about a media material in a program, and the plan information being used to indicate a broadcasting mode of the program;

identifying attribute information about the media material, and determining a type of the media material in accordance with the attribute information about the media material;

determining whether the media material comprises illegal content in accordance with a deep learning model corresponding to the type of the media material, the deep learning model corresponding to the type of the media material being obtained through training in accordance with a predetermined media material rule base corresponding to the type of the media material;

when the media material does not comprise the illegal content, determining that the media material has passed an audit successfully; and obtaining the media material in accordance with the program information, and broadcasting the media material in accordance with the plan information, wherein the plan information comprises a download mode of the media material, the download mode of the media material comprising one of scheduled download and instant download, wherein the scheduled download refers to that after the receipt of the program information and the plan information from the server, the display terminal starts to download the media material at a scheduled time, and the instant download refers to that upon the receipt of the program information and the plan information from the server, the display terminal immediately starts to download the media material, wherein the program information comprises at least one of an identifier of the media material, a download address of the media material, a broadcasting frequency of the media material, and a broadcasting order of the media materials, and wherein the plan information further comprises a program priority level and a broadcasting time period, and when there is a conflict between broadcasting time periods of different target programs, a target program with a higher program priority level is broadcasted preferentially.

6. A program broadcasting device for a display terminal, the program broadcasting device comprising a processor and a memory storing therein a program or instruction, wherein the program or the instruction is executed by the processor so as to implement the program broadcasting device according to claim 5.

7. A program generation device in a server, the program generation device comprising a processor and a memory storing therein a program or instruction, wherein the program or the instruction is executed by the processor so as to:

obtain a media material uploaded by a user and audit the media material;

select a target display terminal from a plurality of display terminals;

receive program parameter information inputted by the user, and the program parameter information comprising at least one of an identifier of the media material, a broadcasting start time, a broadcasting end time, a loop mode, a broadcasting start date, a broadcasting end date, a program priority level, a download mode of the media material or a scheduled download start time;

generate information about a target program in accordance with the program parameter information and a display parameter of the target display terminal, the information about the target program comprising program information and plan information, the program information being used to indicate information about the media material in a program, and the plan information being used to indicate a broadcasting mode of the program; and transmit the information about the target program to the target display terminal, wherein the plan information comprises the download mode of the media material, the download mode of the media material comprising one of scheduled download and instant download, wherein the scheduled download refers to that after the receipt of the program information and the plan information from the server, the display terminal starts to download the media material at a scheduled time, and the instant download refers to that upon the receipt of the program information and the plan information from the server, the display terminal immediately starts to download the media material, wherein the program or the instruction is further executed by the processor so as to perform at least one of:

detecting whether there is a time conflict with respect to the information about the target program; and verifying a program broadcasting order with respect to the information about the target program, and wherein the auditing of the media material comprises:

identifying attribute information about the media material, and determining a type of the media material in accordance with the attribute information about the media material;

determining whether the media material comprises illegal content in accordance with a deep learning model corresponding to the type of the media material, the deep learning model corresponding to the type of the media material being obtained through training in accordance with a predetermined media material rule base corresponding to the type of the media material; and when the media material does not comprise the illegal content, determining that the media material has passed an audit successfully.

8. The program generation device according to claim 7, wherein the plan information comprises at least one of a program name, a broadcasting time period, the loop mode, the program priority level, or the scheduled download start time; and the program information comprises at least one of the identifier of the media material, a download address of the media material, a broadcasting frequency of the media material, or a broadcasting order of the media materials.

9. The program generation device according to claim 7, wherein the program or the instruction is executed by the processor so as to: receive marked content for the media material that is inputted by the user and fails to pass the audit; and perform feature extraction on the marked content, and store an extracted feature in the media material rule base.

10. The program generation device according to claim 7, wherein the type of the media material comprises at least one of a text, a video, an audio, a picture, a web page, a document, or a live broadcast stream.

11. A program generation system, comprising a server and a display terminal, wherein the server comprises a program generation device, and the display terminal comprises the program broadcasting device according to claim 6, wherein the program generation device comprises a processor and a memory storing therein a program or instruction, wherein the program or the instruction is executed by the processor so as to:

obtain a media material uploaded by a user and audit the media material;

select a target display terminal from a plurality of display terminals;

receive program parameter information inputted by the user, and the program parameter information comprising at least one of an identifier of the media material, a broadcasting start time, a broadcasting end time, a loop mode, a broadcasting start date, a broadcasting end date, a program priority level, a download mode of the media material or a scheduled download start time;

generate information about a target program in accordance with the program parameter information and a display parameter of the target display terminal, the information about the target program comprising program information and plan information, the program information being used to indicate information about the media material in a program, and the plan information being used to indicate a broadcasting mode of the program; and transmit the information about the target program to the target display terminal;

wherein the auditing of the media material comprises:

identifying attribute information about the media material, and determining a type of the media material in accordance with the attribute information about the media material;

determining whether the media material comprises illegal content in accordance with a deep learning model corresponding to the type of the media material, the deep learning model corresponding to the type of the media material being obtained through training in accordance with a predetermined media material rule base corresponding to the type of the media material; and when the media material does not comprise the illegal content, determining that the media material has passed an audit successfully.

* * * * *